(12) United States Patent
Bosshardt

(10) Patent No.: US 8,871,320 B2
(45) Date of Patent: Oct. 28, 2014

(54) METHOD OF MANUFACTURING LAMINATED FLEXIBLE TUBES

(75) Inventor: Michel Bosshardt, Sainte-Menehould (FR)

(73) Assignee: Cebal SAS, Sainte-Menehould (FR)

( * ) Notice: Subject to any disclaimer, the term of this patent is extended or adjusted under 35 U.S.C. 154(b) by 680 days.

(21) Appl. No.: 12/445,791

(22) PCT Filed: Nov. 8, 2007

(86) PCT No.: PCT/FR2007/001841
§ 371 (c)(1),
(2), (4) Date: Apr. 16, 2009

(87) PCT Pub. No.: WO2008/065280
PCT Pub. Date: Jun. 5, 2008

(65) Prior Publication Data
US 2010/0294390 A1    Nov. 25, 2010

(30) Foreign Application Priority Data

Nov. 10, 2006    (FR) ..................... 06 09803

(51) Int. Cl.
*B32B 1/00* (2006.01)
*B32B 1/02* (2006.01)
(Continued)

(52) U.S. Cl.
CPC .............. *B29C 53/382* (2013.01); *B29C 53/50* (2013.01); *B29C 65/18* (2013.01); *B29C 66/0342* (2013.01); *B29C 66/1122* (2013.01); *B29C 66/1142* (2013.01); *B29C 66/4322* (2013.01); *B29C 66/49* (2013.01); *B29C 66/723* (2013.01); *B29C 66/81465* (2013.01); *B29C 66/83423* (2013.01); *B29D 23/20* (2013.01); *B32B 1/08* (2013.01); *B23B 27/08* (2013.01); *B65D 35/08* (2013.01); *B29C 47/0021* (2013.01); *B29C 47/0059* (2013.01); *B29C 47/0066* (2013.01); *B29C 47/06* (2013.01); *B29C 47/14* (2013.01); *B29C 47/20* (2013.01); *B29C 66/83421* (2013.01);
(Continued)

(58) Field of Classification Search
USPC ........... 428/34.1, 34.8, 35.2, 35.3, 35.4, 35.7, 428/35.8, 35.9, 36.6, 36.7, 36.9, 36.91; 264/176.1, 210.2, 564
See application file for complete search history.

(56) References Cited

U.S. PATENT DOCUMENTS 3,575,769 A    4/1971    Radzio
4,909,726 A    3/1990    Bekele
(Continued)

FOREIGN PATENT DOCUMENTS

EP    0399113    11/1990
EP    0612612    8/1994

*Primary Examiner* — Walter B Aughenbaugh
(74) *Attorney, Agent, or Firm* — Ladas & Parry LLP

(57) ABSTRACT

A manufacturing process for flexible tube skirts including the steps of providing a multi-layer plastic film, cutting out a strip from the multi-layer plastic film, producing a cylindrical sleeve by rolling-welding the strip, and cutting out the sleeve to the desired length to obtain the tube skirts. The strip is cut out from a multi-layer plastic film which has a symmetrical structure in relation to its median plane, with symmetrical layers having the same thickness and made of the same plastic, having the same chemical composition and the same molar mass.

34 Claims, 3 Drawing Sheets

(51) Int. Cl.
  *B32B 1/08*   (2006.01)
  *B28B 3/20*   (2006.01)
  *B29C 47/00*  (2006.01)
  *D01D 5/16*   (2006.01)
  *B29C 53/38*  (2006.01)
  *B29C 53/50*  (2006.01)
  *B29C 65/18*  (2006.01)
  *B29C 65/00*  (2006.01)
  *B29D 23/20*  (2006.01)
  *B23B 27/08*  (2006.01)
  *B65D 35/08*  (2006.01)
  *B29C 47/06*  (2006.01)
  *B29C 47/14*  (2006.01)
  *B29C 47/20*  (2006.01)
  *B29K 23/00*  (2006.01)
  *B29K 101/12* (2006.01)
  *B29K 105/00* (2006.01)
  *B29L 9/00*   (2006.01)
  *B29L 23/20*  (2006.01)

(52) U.S. Cl.
  CPC .. *B29C 2793/0063* (2013.01); *B29C 2793/009* (2013.01); *B29K 2023/0616* (2013.01); *B29K 2023/0625* (2013.01); *B29K 2023/0633* (2013.01); *B29K 2023/0641* (2013.01); *B29K 2023/083* (2013.01); *B29K 2023/086* (2013.01); *B29K 2101/12* (2013.01); *B29K 2105/256* (2013.01); *B29L 2009/00* (2013.01); *B29L 2023/20* (2013.01)
  USPC ..... 428/35.7; 428/36.6; 428/36.7; 428/36.91; 264/176.1; 264/210.2; 264/564

(56) References Cited

U.S. PATENT DOCUMENTS

| 5,638,660 A | 6/1997 | Kuo |
| 6,447,860 B1 * | 9/2002 | Mueller et al. ............... 428/36.6 |
| 2005/0008803 A1 | 1/2005 | Kuehn |
| 2006/0016501 A1 | 1/2006 | Benquet |

* cited by examiner

METHOD OF MANUFACTURING LAMINATED FLEXIBLE TUBES

FIELD OF THE INVENTION

The invention relates to the improvement of a manufacturing process for flexible tubes designed to store and distribute liquid to pasty products. These flexible tubes are said to be "laminated" because they include a head and a flexible skirt that is itself obtained from a "laminated" strip, including several layers of different plastics.

DESCRIPTION OF RELATED ART

The plane strip used within the context of this invention is cut out from a film which includes several layers of different plastics, which combine the various functions that a tube skirt must fulfill (flexibility, dead-fold properties, act as a barrier to diffusion (in particular it must be impermeable to steam), be able to accept printing, etc.). The applicant's European patent EP 0.612.612 describes a multi-layer flexible tube skirt, primarily comprising a polymeric intermediate layer with a barrier effect with regard to oxygen and to flavors, typically made from EVOH (polymeric ethylene-vinyl alcohol)), said layer being sensitive to moisture, and on each face of this intermediate layer, one or more polymeric layers containing polyolefins, all said layers being continuously bonded to each other. This structure is characterized in that all the layers located on the inner surface of the intermediate barrier-effect layer have a limited total thickness, in order to better preserve the flavor or the perfume of the product conditioned.

To obtain such multi-layer films, thinner films are generally used, obtained for example by co-extrusion-lamination, and they are assembled typically by co-lamination with an extruded intermediate layer of a plastic with adhesive properties.

A plane strip is cut from one of these multi-layer films and the strip is rolled to obtain a sleeve. Rolling is carried out so that the strip is turned into the shape of a cylinder, the edges of said strip being placed opposite one another, in general with a slight overlap, then welded together using side-seaming. A tube head, comprising a dispensing opening, is then welded to one end of said skirt. The tube produced in this way is delivered to the conditioner upside down and with its dispensing opening sealed—for example by a capsule screwed onto the neck. The conditioner fills the tube by pouring the product to be conditioned into the end of the tube remaining open. Once the tube has been filled, its open end is flattened and then welded.

Patents FR 1.571.778 or FR 2.846.275, for example, disclose the conventional manufacture of cylindrical sleeves by rolling a strip then heat welding the edges of the strip after these have been placed opposite each other. This process is also called hereafter "rolling-welding". FIGS. 1 to 3 illustrate a device implementing a typical rolling-welding process from prior art making it possible to manufacture such sleeves.

FIG. 1 (including FIGS. 1a-1f) shows a longitudinal cross section in plane XZ, of the device (6) which makes it possible to manufacture a sleeve (4) from a strip (1) rolled up in the form of a reel. The sleeve is then cut to a given length to obtain cylindrical skirts (41) designed to be assembled with heads to obtain flexible tubes. Throughout most of its course within device (6), strip (1) is accompanied by mobile strips (620, 640, 650 and 660) closed on themselves, whose functions are detailed below.

In FIG. 1e, various means of device (6) have been identified by their X-coordinate X=XA to XF, along a direction X which coincides with the axis of the cylindrical sleeve to be produced. The various mobile strips (620, 640, 650 and 660) closed on themselves are illustrated in FIG. 1 and are also shown separately on FIGS. 1a to 1e:

FIG. 1a: the mobile strip (620) interdependent with the central chuck (62), called "inner strip", is shown in cross section in FIG. 3; it is located below the overlapping area of edges 2 and 3 of the strip, and extends from X=XD to X=XG, typically over a length of approximately 1.8 m;

FIG. 1b: the mobile strip (640), known as the "hot outer strip", is located above the overlapping area of edges 2 and 3 of the strip, and extends from X=XE to X=XF, typically over a length of approximately 0.4 m;

FIG. 1c: the mobile strip (650), known as the "cold outer strip", is located above the overlapping area of edges 2 and 3 of the strip, and extends from X=XF to X=XG, typically over a length of approximately 1 m;

FIG. 1d: the mobile strip (660), known as the transport strip, is located below the rolled strip and the sleeve, entraining the tube over a length of approximately 2.5 m, between X=XB and X=XH.

FIG. 1e and FIG. 1f particularly describe strip (1) in device (6) and its progressive shaping into a sleeve by rolling and welding of the edges of said strip (1). FIG. 1e is a cross-sectional view of the strip and the sleeve in plane XZ. FIG. 1f illustrates, as transverse cross sections through plane YZ, in various X-coordinates, notated XA to XH along axis X, the successive stages involved in rolling strip (1), the overlapping of edges (2) and (3) of said strip and welding of said edges.

As it moves through device (6), the strip passes through various zones:
a) upstream of X=XA are to be found first the means (10) of supplying the strip (1), typically a reel uncoiler, followed by a means of side guidance (60). The strip then passes between two tensioning rollers (61), the difference in tangential speed between the upstream tensioning roller (610) and the downstream tensioning roller (611) setting up a tension in the strip designed to stabilize its geometry, in particular by removing the side undulations of its edges. This tension, typically ranging between 0.3 and 0.8 times the yield strength of the material forming the strip (1), is maintained while the tube (4) is being formed. At X=XA, the strip arrives flat and in the correct transverse position, i.e. with its median plane (100) passing through the fixed longitudinal axis (40) of the central chuck (62);
b) between X=XA and X=XB are generally to be found complementary means providing better control over the positioning of the strip on the Y axis. Proper control of the transverse position of the strip is important to obtain a regular longitudinal weld because it is necessary to control the geometrical configuration that the edges of the strip are in at the time of welding.
c) at point X=XB, a central roller (630) is brought up against strip (1) at the level of its median plane (100), so as to begin the rolling of this strip.
d) at point X=XC, the edges (2) and (3) of the strip are guided towards each other by special means. They are, for example, engaged in the grooves of grooved rollers (6310). FIG. 2 shows a cross section through plane YZ, of a device (631) to guide the edges (2,3) of the strip (1), using two grooved rollers (6310), the edges being maintained in the grooves.
e) between X=XC and X=XD are means (not shown) for maintaining the central chuck in position (62) and possibly for continuing rolling of the strip.
f) between X=XD and X=XE, rollers (632) and (633) are applied laterally, as shown in FIG. 3, so as to fold back the edges (2,3) of the strip. FIG. 3 shows as a cross section in plane YZ the rolling of the strip (1) using rollers (632) and (633). These rollers press against the central chuck and have a concave surface (6320, 6330) which fits the shape of the latter. They accompany the strip and guide edges (2) and (3) until they are opposite each other. The strip encounters several pairs of rollers, whose axes (6321) and (6331) are more and more tilted, their convergence point being located on the same side as the overlapping area, in order to place edges (2) and (3) opposite each other, then to firmly hold them there and obtain the most stable possible overlap geometry. It is essential that the geometrical configuration in which the edges of the strip are is the most stable possible at the time of welding. It is particularly this which determines the width of the overlap and therefore the width of the visible weld.

g) between X=XE and X=XF, the edges are kept superimposed on one another, or simply placed one against the other, by means of pressure exerted by the hot outer strip (640) on the inner strip (620). Under this pressure, the edges are welded to each other by means of heat introduced at this point.

h) between X=XF and X=XG, the weld is cooled while the sleeve remains held from inside by the central chuck (62) and while the welding zone is kept compressed between the mobile inner strip (620) and the cold outer strip (650).

i) Between XG and XH, the cylindrical sleeve obtained in this way leaves its sizing device (mobile strips (620) and (650) and the central chuck (62)) and is then cut (67) to the desired length into cylindrical skirts (41).

Despite all the precautions taken to control the side positioning of the strip, the geometrical configuration in which the edges of the strip find themselves when the latter arrives in the welding zone is not as stable as is required and the quality of the welding suffers as a result. Even though visible defects on the same skirt can be avoided, the width of the longitudinal weld may vary significantly over time, either becoming too broad and particularly unattractive, or becoming too narrow, or even non-existent, which requires difficult and expensive continuous quality control of the weld to be set up. Since the phenomenon becomes more marked as the speed of the strip increases, the productivity of the process is limited as a result.

Moreover, in a great number of cases it can be observed that the sleeve, while leaving the sizing device made up by all the mobile strips (620) and (650) and the central chuck (62), loses its perfectly circular shape. Its cross section takes on the shape of a "water droplet" which is particularly detrimental to the later operations carried out within the context of flexible tube manufacture. Initially, during assembly of the tube head onto one end of the skirt, this does not coincide well with the open end of the molded head to which it must be connected. Next, the other end of the skirt is a later source of problems since the conditioner must fill the flexible tube by introducing a nozzle through this open end of the skirt. If this open end is not perfectly circular, the automatic introduction of the filling nozzle may be impaired (the end of the skirt may get stuck onto the filling nozzle for example), which requires the addition of expensive means of centering and calibration to obtain the desired rates of filling. Lastly, when the tube is filled, this same end requires final welding which can have many defects if the end of the skirt does not have repetitive circular geometry. Among these defects may be found, for example, an unstable position of the longitudinal weld in relation to said final weld.

In French patent FR 2.846.275, the applicant proposed plastically pre-deforming the multi-layer strip before producing the sleeve. But such a solution both introduces an additional stage into the process and involves variations in length or width which require further cutting. It is really economically justified only when it is desired to produce flexible tubes with skirts that have embossed relief decorations.

The applicant sought to modify said sleeve manufacturing process in order to improve the conditions for obtaining a stable longitudinal weld without having to impose additional plastic deformation on the strip.

SUMMARY OF THE INVENTION

A first purpose according to the invention is a manufacturing process for flexible tube skirts including the following stages:

a) providing a multi-layer plastic film;

b) cutting out a strip from said multi-layer plastic film;

c) producing a cylindrical sleeve by rolling-welding said strip;

d) cutting out said sleeve to the desired length to obtain said tube skirts;

characterized in that the strip is cut out from a multi-layer plastic film which has a perfectly symmetrical structure in relation to its median plane, i.e. having symmetrical layers with substantially the same thickness and substantially made up of the same plastic, i.e. consisting of a polymer or a mixture of several polymers in identical proportions, said polymer(s) being produced from monomers with the same chemical composition and substantially the same average molar mass.

The solution recommended within the context of this invention differs from that recommended in FR 2.846.275 where it was attempted to "iron out" the differences in mechanical behavior of the layers by deforming them plastically so as to redistribute the residual stresses reigning within the structure. Here, it is attempted to limit the heterogeneous behavior of the various layers by aiming at as perfect as possible a symmetry in relation to the median plane of the film, not only geometrical but also concerning the material used, it not being deemed sufficient to have the same chemical composition of the basic monomer(s). The symmetrical layers therefore have substantially the same thickness, i.e. thicknesses that are different from one another by less than 2 μm for thicknesses lower than 20 μm and by less than 10% for larger thicknesses, preferably by less than 5% for thicknesses higher than 40 μm. The symmetrical layers are made up of substantially the same material, i.e. polymers made up not only of monomers of the same chemical composition but also with comparable macromolecule lengths, resulting in $\overline{M_n}$ substantially equal (averages by number) molar masses, namely differing from one another by less than 10%, preferably by less than 5%.

Preferably, these materials have statistical distributions of the polymeric chains that are as close as possible, i.e., with a margin of 5%, the same polymolecularity index $$IP = \frac{\overline{M_w}}{\overline{M_n}},$$

where $\overline{M_n}$ is the average molar mass by number and $\overline{M_w}$ is the average molar mass by weight. These latter can be represented by the general formula $$\overline{M_a} = \frac{\sum_i N_i M_i^a}{\sum_i N_i M_i^{a-1}},$$

where $\overline{M_n} = \overline{M_a}$ with $\alpha=1$ and $\overline{M_w} = \overline{M_a}$ with $\alpha=2$.

As measurement of the polymolecularity modulus is generally quite tricky and expensive to perform, it is preferred to carry out at least two simultaneous tests on each material in the symmetrical layers to make sure that they behave in the same way: differential scanning calorimetry (DSC) and Fourier transform infra-red spectroscopy (FTIR). By providing thermograms F=F(T), where F represents the heat flow (for example in W/g) and T the temperature, differential scanning calorimetry is used to locate the melting, or more generally, phase shift points which are characteristic of the crystalline structural of the polymer. The FTIR is based on the infra-red absorption of radiation by the material being analyzed. Using the detection of the characteristic vibrations of the chemical bonds, it makes it possible to perform the analysis of the chemical functions present in the material, the absorption intensity of a characteristic wavelength being related to the proportion of the chemical grouping responsible for the absorption. By comparing the thermograms obtained by DSC and the FTIR spectra of the materials in the two symmetrical layers, their degree of similarity can be characterized. The materials relative to said symmetrical layers must therefore have substantially the same DSC thermograms and substantially the same FTIR spectra. The expressions "substantially the same spectra" and "substantially the same thermograms" must be interpreted according to the measurement equipment available and the comparison processing software with which it is provided. In this case, these expressions can be translated by: the comparison of these graphs makes it possible to believe that there is a probability higher than 80%, and preferably a probability higher than 90%, that the materials are identical.

The symmetry in relation to the median plane of the film particularly makes it possible to compensate for shrinkage or differential deformations between layers occurring on one side of the film by shrinkage or differential deformations between layers occurring on the other side of the film. For example, the structure presented in EP 0.612.612 has a single EVOH layer, not located on the median plane to limit flavor or perfume losses from the conditioned product. As the mechanical behavior of the EVOH differs from that of the other layers (it is in general more rigid), the dissymmetry which results from this increases the risks of unbalanced residual stresses forming.

The process according to the invention results in the use of a film with an odd number (2n +1) of layers, i.e. a film in which all the 2n non-central layers have a symmetry in relation to the median plane of the film, and whose central layer is symmetrical in relation to the median plane. Preferably, the material of the central layer is more flexible or more elastomeric than the other layers. In other words, this material has a lower average Young modulus than that of the other layers. The applicant noted that a tube skirt made from a film which, all things being equal, has a central layer composed of a particularly flexible polyolefin is better suited to the industrial requirements of printing, probably because the shear modulus, correlated with the Young modulus, is low, which allows this central layer to be greatly sheared (while remaining within the elastic range) to adapt the positioning of the layers between each other. In addition, said skirt is more resistant to boring and is even more resistant to stress-cracking. Such a material may, for example, in particular for a film containing several polyolefin layers, be a linear polyethylene, in particular selected from among the hexene copolymers, and more particularly a low density linear polyethylene hexene copolymer (LDPE), an EVA (ethylene vinyl acetate copolymer), a very low density polyethylene (VLDPE), i.e. with a density typically ranging between 0.88 g/cm3 and 0.93 g/cm3, or a polyethylene obtained with metallocene single-site catalysts.

Advantageously, to limit the effects related to the residual stresses in the multi-layer film, in particular the curling effect when cutting the strip and the geometrical instability of the strip which results from this, the symmetrical layers have comparable mechanical behavior, namely an average Young modulus and an elastic limit that are substantially close, typically average Young moduli differing by less than 5% from one another and elastic limits differing by less than 5% from one another.

Such a reduction in the internal stresses within the film makes it possible to improve the conditions for producing the longitudinal weld, as well as the conditions for welding the head onto the skirt and the conditions for filling the tube, because of the regularity of the circular shape of the skirt obtained in this way.

In a preferred method of the invention, in order to obtain excellent mechanical homogeneity, it is attempted to ensure that the materials used in the symmetrical layers have undergone overall the same thermal and mechanical stresses during the multi-layer film manufacturing process. Advantageously, the symmetrical layers are produced simultaneously, typically by extrusion, with the same basic material. For example, all the layers that make up the film are co-extruded and co-rolled simultaneously, the symmetrical layers being extruded from the same basic material. In practice, the extrusion machines are supplied with pellets having the same origin and the various flows of molten matter obtained are directed towards the same co-extrusion die.

An initial way of working is to co-extrude the various layers of the multi-layer film by using a flat co-extrusion die, then to calender the stack of co-extruded layers.

Another way of operating is to co-extrude and inflate a cylindrical multi-layer sheath using a ring shaped straight manifold co-extrusion die. The sheath is inflated so that it forms a thin-walled bubble which is then nipped and flattened, the internal layer of the extrudate being placed side by side against itself. Advantageously, the double internal layer obtained in this way is produced using a material that is able to adhere to itself under the effect of the bubble flattening pressure, at the typical bubble-nipping temperature, namely between 40° C. and 80° C. This material has a melting point ranging between 100° C. and 120° C. and it is preferably selected from plastics for which the recommended sealing temperature is in the range 40° C. and 60° C. These are, for example, a thermoplastic such as a linear polyethylene, in particular selected from among the hexene polyethylene copolymers, and more particularly a low density linear hexene polyethylene copolymer (LDPE), a polyethylene with very low density (VLDPE with a density ranging between 0.88 g/cm3 and 0.93 g/cm3), a polyethylene obtained using metallocene single-site catalysts, an EVA (ethylene vinyl acetate copolymer), or grafted copolymers such as an EAA (ethylene-acrylic acid copolymer or an ethylene-alkyl acrylate copolymer), in particular an EAA ionomer, for example Surlyn (a registered trademark of Dupont de Nemours) or a copolymer (ethylene-acrylic ester) such as an EBA (ethylene-butyl acrylate copolymer) or an EMMA (ethylene-methyl acrylate copolymer or ethylene-maleic anhydride copolymer).

To prevent delamination of the film obtained by this process, it is recommended to inflate the bubble using a non-oxidizing gas. The self-adhesion of the internal layer can be characterized: typically, the two central layers, made of the same internal material, adhere to each other with an adhesive force of at least 6 N/15 mm.

When it is desired to produce skirts which have good barrier properties against diffusion, a film can advantageously be used which has two layers of barrier property material, typically a copolymer (ethylene-vinyl alcohol) (EVOH), placed symmetrically in relation to the median plane of the film, each located typically at 50-100 μm from the outer surface. This skirt structure is different from that described in EP 0.612.612, for example, where a single layer made of EVOH is placed on the side of the skirt inner wall, at 140 μm maximum from the outer surface, in order to limit moisture and perfume losses of the substance contained in the tube. The symmetrical structure according to the invention preferentially has two layers with barrier properties located at a shorter distance from the outer surface. By decreasing the cumulated thickness of the layers between the outer surface and the EVOH layer, moisture (and perfume) losses of the substance contained in the tube are greatly decreased, at least initially. Even if the nearest barrier layer is ultimately damaged by the effect of moisture, it slows down the diffusion of moisture and perfumes to the other barrier layer which remains completely effective much longer.

The strip is preferably cut from a multi-layer film the total thickness of which lies between 200 μm and 450 μm, and preferably between 300 μm and 400 μm.

Another object according to the invention is a flexible tube skirt, made up by stacking an odd number of layers of plastic characterized in that the layers which are placed on either side of the central layer and which have the same rank, one in the centrifugal radial direction, the other in the centripetal radial direction, have substantially the same thickness and are substantially made up of the same plastic, i.e. they consist of a polymer or a mixture of several polymers in identical proportions, said polymer(s) being produced from monomers with the same chemical composition and having substantially the same average molar mass.

This is a laminated skirt: the stacked layers are ring-shaped, and a small portion of the ring may be made of a different plastic from the material making up the rest of the layer and resulting from melting all the plastic in the film when producing the longitudinal weld.

Another subject according to the invention is a flexible tube designed to store and distribute liquid to pasty products characterized in that it is provided with a skirt according to the invention.

DESCRIPTION OF THE PREFERRED EMBODIMENTS

Example 1

FIG. 4

Figure 1:
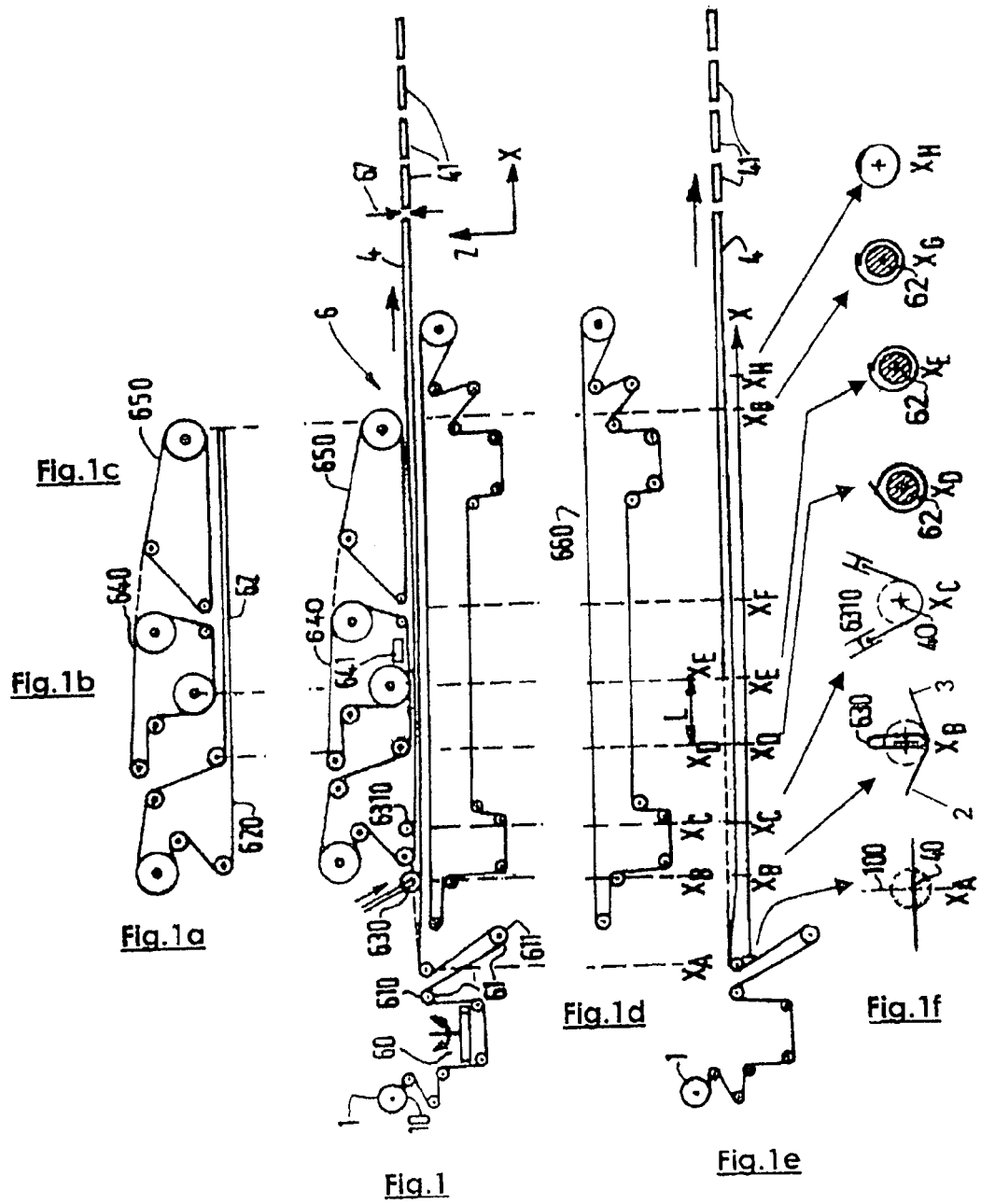
FIG. 1 (including FIGS. 1a-1f), 2 and 3 schematically illustrate a device implementing a typical process from prior art making it possible to manufacture cylindrical sleeves from strips cut from films.
Figure 2:
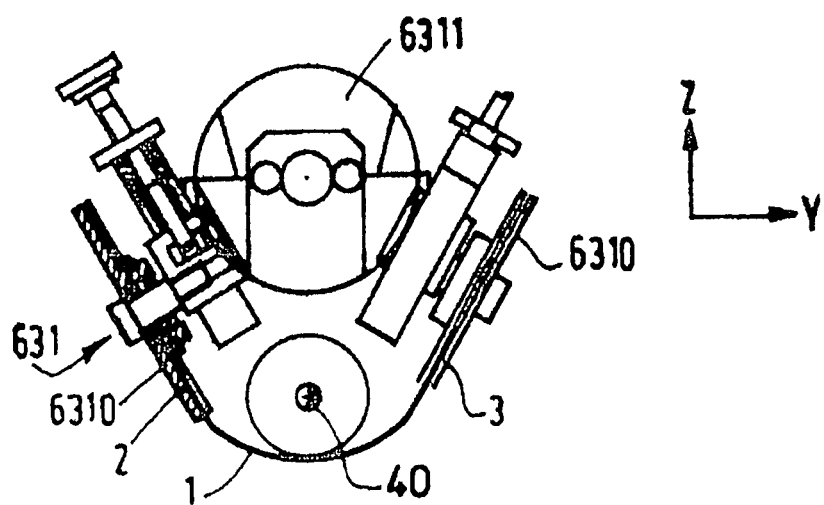
Figure 3:
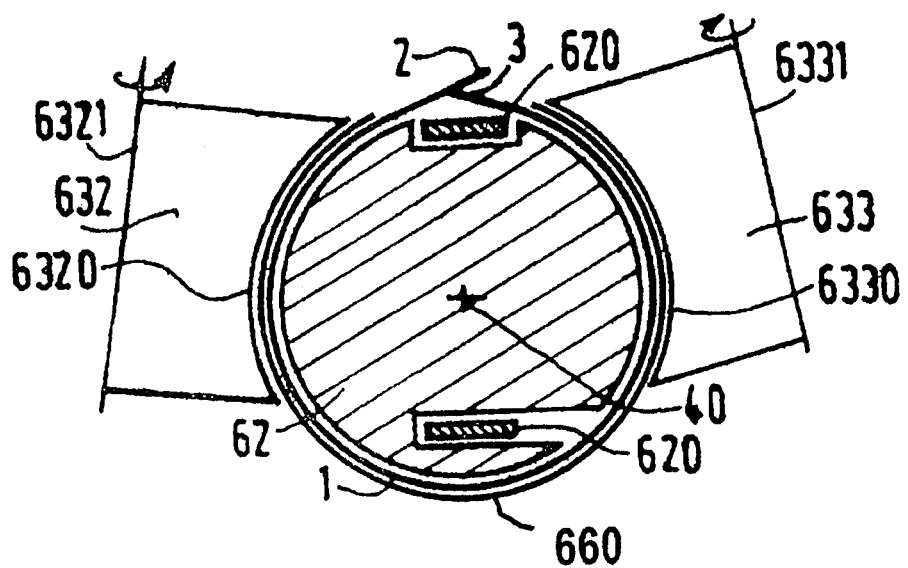
Figure 4:
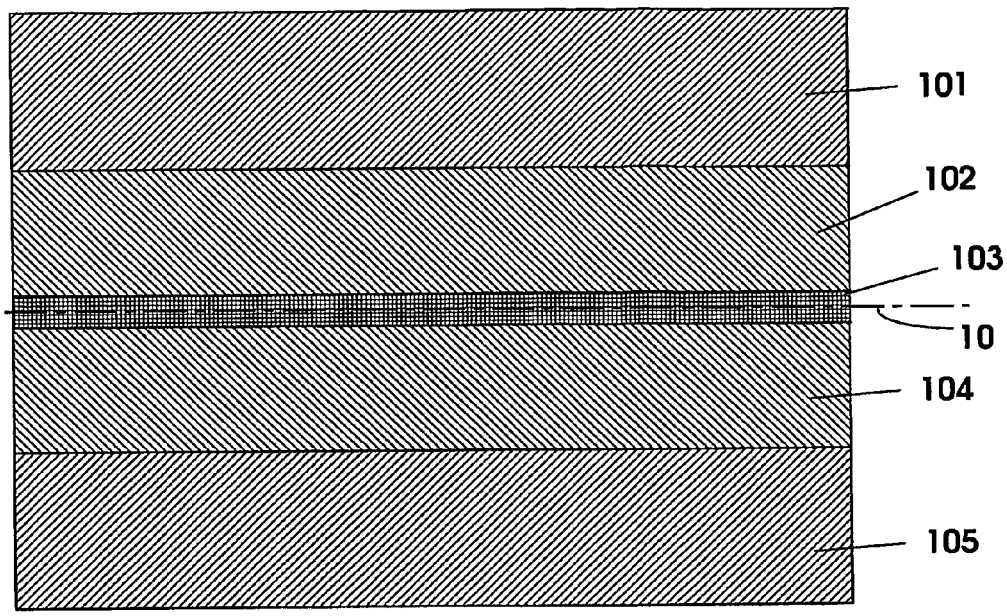
FIGS. 4 and 5 illustrate schematically two skirt structures obtained according to the invention.
Figure 5:
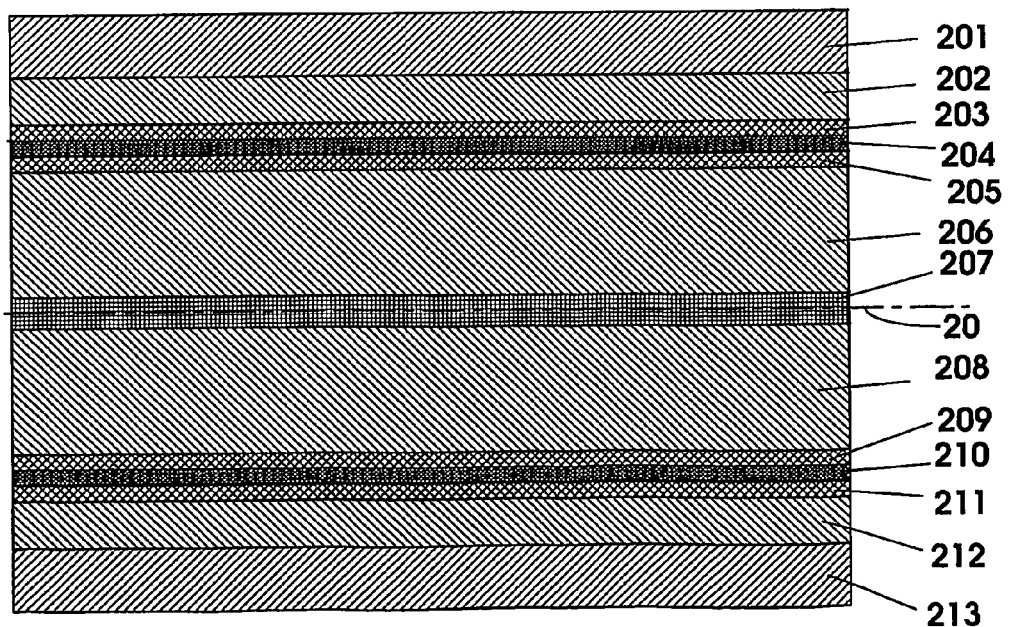

A symmetrical film A is produced by die co-extrusion followed by calendering.

Three extrusion machines supplied respectively with LDPE, MDPE and EVA are placed upstream of the flat co-extrusion die, designed so that the flow paths lead to rectangular openings, the two paths of the BDPE leading to the external openings, that of the EVA leading to the central opening, and those of the MDPE leading to the intermediate openings.

The stack of layers obtained in this way is compressed by cylinders which are entrained and whose temperature is controlled: this is the calendering operation which makes it possible to obtain a film of defined thickness.

The film is then cooled over a sufficient distance before being rolled up to make a jumbo reel. This reel is then split to produce the strips during a reworking operation. It has the following structure:

|  | layer | | | | |
| --- | --- | --- | --- | --- | --- |
|  | 101 | 102 | 103 | 104 | 105 |
| material | LDPE | MDPE | EVA | MDPE | LDPE |
| thickness | 60 μm | 120 μm | 20 μm | 120 μm | 60 μm |

The strip widths are defined according to the diameter of the skirt to be produced: 111 mm for a Ø 35 tube, 126 mm for a Ø 40 tube, and 156 mm for a Ø 50 tube.

The film is subjected to a curling test: each surface of the film is placed up against a plane surface and a double notch in the shape of cross is made in the film: if any residual stresses are released, the corners thus formed open out and the spacing between two opposite corners, indicating the extent of the released residual stresses, is measured. The branches of the notch are of the same length and are laid out at 45° in relation to the longitudinal axis (extrusion axis) so that two opposite corners are associated with the longitudinal direction (MD), and other the other two corners are associated with the perpendicular direction (CMD). The distance between the opposite corners in each direction is measured.

In the MD direction, the distance between the corners is in all cases negligible (less than 0.8 mm). In the CMD direction, the distance between the corners is negligible when the notch is made on the surface of the film corresponding to the inner surface of the reel, and less than 15 mm when the notch is made on the surface of the film corresponding to the outer surface of the reel.

The strip is then rolled and welded longitudinally (side-seaming) to produce a cylindrical sleeve from which the skirts will be cut out. The width of the weld is stable: it varies between 1.8 and 2.2 mm. The section of the sleeve leaving the sizing device has a stable shape showing very slight ovalization (the ratio of the diameters measured in two perpendicular directions ranging between 0.98 and 1.02).

Example 2

FIG. 5

A symmetrical film B is produced by coextrusion/inflation of a cylindrical sheath followed by flattening of the bubble obtained in this way It has the following structure:

| | layer | | | | | | | | | | | | |
|---|---|---|---|---|---|---|---|---|---|---|---|---|---|
| | 201 | 202 | 203 | 204 | 205 | 206 | 207 | 208 | 209 | 210 | 211 | 212 | 213 |
| material | LDPE | MDPE | EMA | EVOH | EMA | LDPE | EVA | LDPE | EMA | EVOH | EMA | MDPE | LDPE |
| thickness | 40 μm | 30 μm | 10 μm | 12 μm | 10 μm | 80 μm | 2 * 10 = 20 μm | 80 μm | 10 μm | 12 μm | 10 μm | 30 μm | 40 μm |

The extruded and inflated sheath, cooled by air qt room temperature, is calibrated and stabilized before being flattened by passing through a flattening mangle (a set of rollers laid out so that they flatten the film progressively) then through nipper rollers (which close the bubble inflated by the air) coupled with pulling rollers and tension balancing rollers.

During nipping the parts opposite the inner layer of the sheath are flattened against each other. They are at a temperature (typically between 40° C. and 80° C.) corresponding to a sealing temperature, which is lower than the melting point of the material (EVA in this case) so that the two layers are joined and now form but one layer (cohesive bonding). To improve adhesion, the inflation gas can be modified by introducing a non-oxidizing atmosphere (for example nitrogen) and one or more passes through pressing rollers, regulated at a pressure typically between 4 and 6 bar can be added at the output.

After flattening the film is collected on a reel after the folded edges have been cut using rotary knives.

The curling tests give good performances in both directions: in the MD direction, the distance between the corners is in all cases negligible (less than 0.8 mm). In the CMD direction, the distance between the corners is negligible when the notch is made on the surface of the film corresponding to the inner surface of the reel, and 9 mm when the notch is made on the surface of the film corresponding to the outer surface of the reel.

For purposes of comparison, we performed curling tests on a nonsymmetrical film C, corresponding to a standard from prior art having substantially the same thickness as film B (405 μm) and with the following structure:

| | |
|---|---|
| LDPE | 150μ |
| MDPE | 100μ |
| EMA | 10μ |
| EVOH | 15μ |
| EMA | 10μ |
| LDPE | 120μ |

In the MD direction, the distance between the corners is negligible when the notch is made on the surface of the film corresponding to the inner surface of the reel, and 15 mm when the notch is made on the surface of the film corresponding to the outer surface of the reel. In the CMD direction, the distance between the corners is negligible when the notch is made on the surface of the film corresponding to the inner surface of the reel, and 30 mm when the notch is made on the surface of the film corresponding to the outer surface of the reel.

The strip cut from film B is then rolled and welded longitudinally (side-seaming) to produce a cylindrical sleeve from which the skirts are cut out. The section of the sleeve leaving the conforming device of has a stable shape showing very slight ovalization. Over several dozen measurements, the following has been established:

| | |
|---|---|
| average maximum diameter: | 50.41 mm |
| average minimum diameter: | 49.03 mm |
| average difference between average minimum and maximum diameters: | 1.38 mm |

By comparison, the sleeve obtained from the strip produced in film C has a less stable geometry:

| | |
|---|---|
| average maximum diameter: | 52.19 mm |
| average minimum diameter: | 47.80 mm |
| average difference between average minimum and maximum diameters: | 4.39 mm |

To compare the barrier properties of a symmetrical film according to the invention with a standard nonsymmetrical film from prior art, we took measurements on thinner structures (300 μm).

Film D was produced by coextrusion/inflation of a cylindrical sheath followed by flattening of the bubble obtained in this way. It has the following structure:

| | material | | | | | | | |
|---|---|---|---|---|---|---|---|---|
| | LDPE | EMA | EVOH | EMA | LDPE | EMA | EVOH | EMA | LDPE |
| thickness | 50 μm | 8 μm | 12 μm | 8 μm | 160 μm | 8 μm | 12 μm | 8 μm | 50 μm |

It has good barrier properties, better than those of a dissymmetrical film with only one barrier layer of thickness equal to the total thickness of the barrier layers of said film.

So in relation to a standard film E of comparable total thickness (300 μm) and with the following structure:

| | |
|---|---|
| LDPE | 150μ |
| EMA | 5μ |
| EVOH | 25μ |
| EMA | 5μ |
| LDPE | 115μ | it has improved barrier properties:

| | |
|---|---|
| O2 permeability (RH 90%, 38° C.): | 0.34 cc/m2/day, whereas film E has an O2 permeability of 0.67 cc/m2/day; |
| steam permeability (RH 50%, 30° C.): | 0.43 g/m2/day, whereas film E has a steam permeability of 0.52 g/m2/day. |

The strip is then rolled and welded longitudinally (side-seaming) to produce a cylindrical sleeve from which the skirts are cut out. Two series of tubes are produced: one with skirts cut out from film D and one with skirts cut out from film E. To assess the barrier performance of the tubes produced in this way, they are filled with a given quantity of a creamy product, rich in flavors and essential oils (an analgesic ointment designed to reduce muscular and joint pains); they are sealed and stored. After a certain amount of time, the weight loss of this product contained in the tube is measured.

Weight loss (after 12 months—room temperature) 1.5% on average, whereas the weight loss is 1.9% on average for tubes produced with skirts made from film E.

The invention claimed is:

1. A flexible tube skirt, made up by stacking an odd number of layers of plastic to form a film having a central layer and one or more pair/s of non-central symmetrical layers, wherein each pair of the non-central layers is disposed on either side of the central layer, and each pair of the non-central layers has the same rank, one layer in the centrifugal radial direction, the other in the centripetal radial direction, each pair of the non-central layers has substantially the same thickness and is substantially made from the same plastic material, in that each pair of the non-central layers consists of a polymer or a mixture of several polymers in identical proportions, said polymer(s) being produced from monomers with the same chemical composition and having substantially the same average molar mass, and wherein the average Young modulus of the plastic in the central layer is lower than the average Young modulus of the plastic in the non-central layers.

2. A flexible tube skirt according to claim 1, wherein the materials from which each pair of said non-central symmetrical layers are made have substantially the same polymolecularity index $$IP = \frac{\overline{M_w}}{\overline{M_n}},$$

where $\overline{M_n}$ is the average molar mass by number and $\overline{M_w}$ is the average molar mass by weight.

3. A flexible tube skirt according to claim 1, wherein said central layer is a material belonging to the group of the linear polyethylenes.

4. A flexible tube skirt according to claim 1, wherein the average Young moduli of each pair of non-central symmetrical layers differs by less than 5%, and wherein elastic limits of each pair of non-central symmetrical layers of film differs by less than 5%.

5. A flexible tube skirt according to claim 1, wherein the total thickness lies between 200 μm and 450 μm.

6. A flexible tube comprising a flexible tube skirt according to claim 1.

7. A flexible tube skirt according to claim 3, wherein said central layer is a material selected from among the hexene copolymers.

8. A flexible tube skirt according to claim. 3, wherein said central layer is a material selected from the group consisting of low density linear polyethylene hexene copolymers (LL-DPE), very low density polyethylenes (VLDPE) with a density ranging between 0.88 g/cm3 and 0.93 g/cm3, polyethylenes obtained with metallocene single-site catalysts, ethylene vinyl acetate copolymers, and grafted copolymers.

9. A flexible tube skirt according to claim 8, wherein the grafted copolymers are selected from the group consisting of EAA ionomers and copolymers.

10. A flexible tube skirt according to claim 9, wherein the EAA copolymers are selected from the group consisting of ethylene-butyl acrylate copolymer, ethylene-methyl acrylate copolymer, and ethylene-maleic anhydride copolymer.

11. A flexible tubeskirt according to claim 8, wherein the grafted copolymers are ethylene-acrylic acid copolymers or ethylene-alkyl acrylate copolymers.

12. A flexible tube skirt according to claim 1, wherein each pair of non-central layers have a symmetry in relation to a median plane of the film, and wherein the central layer is symmetrical in relation to the median plane of the film.

13. A flexible tube skirt according to claim 1, wherein the total thickness lies between 300 μm and 400 μm.

14. A manufacturing process for producing a flexible tube skirt according to claim 1, said process comprising the steps of:
a) providing the multi-layer film of claim 1;
b) cutting out a strip from said multi-layer plastic film;
c) producing a cylindrical sleeve by rolling-welding said strip;
d) cutting out said sleeve to obtain said tube skirt.

15. A manufacturing process for a flexible tube skirt according to claim 14, wherein the materials from which said symmetrical layers are made have substantially the same polymolecularity index $$IP = \frac{\overline{M_w}}{\overline{M_n}},$$

where $\overline{M_n}$ is the average molar mass by number and $\overline{M_w}$ is the average molar mass by weight.

16. A manufacturing process for a flexible tube skirt according to claim 14, wherein the materials from which said symmetrical layers are made have substantially the same DSC thermograms and substantially the same Fourier transform infra-red spectroscopy (FTIR) spectra.

17. A manufacturing process for a flexible tube skirt according to claim 14, wherein said central layer is a material belonging to the group of the linear polyethylenes.

18. A manufacturing process for a flexible tube skirt according to claim 14, wherein the average Young moduli of each pair of non-central symmetrical layers differs by less than 5%, and wherein elastic limits of each pair of non-central symmetrical layers of film differs by less than 5%.

19. A manufacturing process for a flexible tube skirt according to claim 14, wherein the symmetrical layers are produced simultaneously with the same basic material.

20. A manufacturing process for a flexible tube skirt according to claim 14, wherein all the layers that make up the film are co-extruded and co-rolled simultaneously, the symmetrical layers being extruded from the same basic material.

21. A manufacturing process for a flexible tube skirt according to claim 14, wherein the various layers of the multi-layer film are coextruded using a flat coextrusion die, and then the stack of coextruded layers is calendered.

22. A manufacturing process for a flexible tube skirt according to claim 14, wherein a cylindrical multi-layer sheath is inflated so that it forms a bubble which is then nipped and flattened, the inner layer of the extrudate being placed side by side against itself to form a double inner layer.

23. A manufacturing process for a flexible tube skirt according to claim 22, wherein the double inner layer is flattened between 40° C. and 80° C.

24. A manufacturing process for a flexible tube skirt according to claim 22, wherein said internal double layer is made from a thermoplastic selected from plastics for which the melting point lies between 100 and 120° C. and the recommended sealing temperature lies between 40° C. and 60° C.

25. A manufacturing process for a flexible tube skirt according to claim 23, wherein said double inner layer is made from a thermoplastic belonging to the group of the linear polyethylenes.

26. A manufacturing process for a flexible tube skirt according to claim 22, wherein the bubble is inflated at room temperature, using a non-oxidizing gas.

27. A manufacturing process for a flexible tube skirt according to claim 14, wherein a film is used that includes layers placed symmetrically in relation to the symmetry plan of the film, located at 50-100 µm from the outer surface, and made up of a material with barrier properties against diffusion.

28. A manufacturing process for a flexible tube skirt according to claim 17, wherein said central layer is a material selected from among the hexene copolymers.

29. A manufacturing process for a flexible tube skirt according to claim 17, wherein said central layer is a material selected from the group consisting of low density linear polyethylene hexene copolymers (LLDPE), very low density polyethylenes (VLDPE) with a density ranging between 0.88 g/cm3 and 0.93 g/cm3, and polyethylenes obtained with metallocene single-site catalysts.

30. A manufacturing process for a flexible tube skirt according to claim 22, wherein said double inner layer is a material selected from the group consisting of low density linear polyethylene hexene copolymers (LDPE), very low density polyethylenes (VLDPE) with a density ranging between 0.88 g/cm3 and 0.93 g/cm3, polyethylenes obtained with metallocene single-site catalysts, EVAs (ethylene vinyl acetate copolymers), and grafted copolymers.

31. A manufacturing process for a flexible tube skirt according to claim 30, wherein the grafted copolymers are selected from the group consisting of EAA ionomers and copolymers.

32. A manufacturing process for a flexible tube skirt according to claim 31, wherein the EAA copolymers are selected from the group consisting of ethylene-butyl acrylate copolymer, ethylene-methyl acrylate copolymer, and ethylene-maleic anhydride copolymer.

33. A manufacturing process for a flexible tube skirt according to claim 30, wherein the grafted copolymers are ethylene-acrylic acid copolymers or ethylene-alkyl acrylate-copolymers.

34. A manufacturing process for a flexible tube skirt according to claim 27, wherein the material with barrier properties against diffusion is an EVOH copolymer (ethylene-vinyl alcohol).

* * * * *